United States Patent
Izutani et al.

(10) Patent No.: US 8,277,999 B2
(45) Date of Patent: Oct. 2, 2012

(54) FUEL CELL SYSTEM AND METHOD TO PREVENT FREEZING AFTER SHUT-DOWN

(75) Inventors: Takahide Izutani, Susono (JP); Nobuyuki Kitamura, Yamanashi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1075 days.

(21) Appl. No.: 12/223,582

(22) PCT Filed: Jan. 30, 2007

(86) PCT No.: PCT/IB2007/000206
§ 371 (c)(1),
(2), (4) Date: Aug. 4, 2008

(87) PCT Pub. No.: WO2007/091137
PCT Pub. Date: Aug. 16, 2007

(65) Prior Publication Data
US 2009/0029200 A1    Jan. 29, 2009

(30) Foreign Application Priority Data
Feb. 6, 2006 (JP) .................................. 2006-028470

(51) Int. Cl.
*H01M 8/04* (2006.01)
(52) U.S. Cl. ........................................ 429/450; 429/428
(58) Field of Classification Search .................. 429/450, 429/430
See application file for complete search history.

(56) References Cited

U.S. PATENT DOCUMENTS

| | | | |
|---|---|---|---|
| 2003/0077487 A1 | 4/2003 | Roberts et al. | |
| 2004/0101734 A1 | 5/2004 | Morishima et al. | |
| 2004/0219401 A1* | 11/2004 | Hobmeyr et al. | 429/13 |
| 2005/0053814 A1 | 3/2005 | Imamura et al. | |
| 2005/0214605 A1 | 9/2005 | Saitoh et al. | |

FOREIGN PATENT DOCUMENTS

| | | |
|---|---|---|
| DE | 103 14 820 | 12/2004 |
| JP | 2003-297399 | 10/2003 |

(Continued)

OTHER PUBLICATIONS

International Search Report.
Written Opinion of the ISR.
German Office Action for German Appl. No. 11 2007 000 300.6-45 dated Dec. 1, 2011.

(Continued)

*Primary Examiner* — Patrick Ryan
*Assistant Examiner* — Muhammad Siddiquee
(74) *Attorney, Agent, or Firm* — Finnegan, Henderson, Farabow, Garrett & Dunner, LLP

(57) ABSTRACT

A fuel cell system has an apparatus sending gas to the fuel cell; a part calculating an amount of residual water in the fuel cell system based on an operating and an environmental condition; a part judging whether at least one state quantity value that includes a generating duration of the fuel cell, an amount of electric power generated, and an amount of temperature change of a coolant is equal to or less than a prescribed threshold value; a part calculating a sending apparatus operating time for decreasing the residual water amount to a prescribed value; and a control part operating the gas sending apparatus until the end of the operating time, wherein the operating time calculating part calculates a different operating time depending on whether one of the state quantity values is equal to or less than a prescribed threshold value.

9 Claims, 6 Drawing Sheets

FOREIGN PATENT DOCUMENTS

| | | |
|---|---|---|
| JP | 2004-39527 | 2/2004 |
| JP | 2005-141943 | 6/2005 |
| JP | 2005-158430 | 6/2005 |
| WO | WO 2005/053070 | 6/2005 |

OTHER PUBLICATIONS

Notification of Reason(s) for Refusal for JP Appl. No. 2006-028470 dated Jan. 24, 2012.

* cited by examiner

FUEL CELL SYSTEM AND METHOD TO PREVENT FREEZING AFTER SHUT-DOWN

BACKGROUND OF THE INVENTION

1. Field of the Invention

The present invention relates to a fuel cell system and a method for reducing water from a fuel cell system.

2. Description of the Related Art

If excess water is present in a fuel cell and the passages thereof, when a solid polymer fuel cell (hereinafter simply fuel cell) system is stopped, there is the problem of the water content freezing if the system is left for a long period of time below the freezing point. In order to achieve stable operation of a fuel cell system even below the freezing point, it is necessary to remove the water from the passages in the fuel cell system when the fuel cell system is stopped. For this reason, in a fuel cell system that includes passages for gas that circulates, gas is caused to circulate (scavenge) in a passage that includes a gas-liquid separator, so as to reduce the residual water amount. However, if the gas scavenging in the passages of a fuel cell system lasts for a long period of time, the amount of time that the fuel cell system must be stopped is long, so that inconvenience occurs in the use of the fuel cell system. Specifically, because a pump is used to supply scavenging gas and diluted air, there are the problems of a large amount of electrical power being used for the scavenging gas over a long period of time and the noise generated when the pump is driven. Additionally, after the ignition switch is set to off, there is the problem of time being required for processing of the stopping of the fuel cell system, which reduces the value of the fuel cell system as a product.

Additionally, protons (hydrogen ions) within the electrolyte membrane of the fuel cell are moved by water molecules. In operating the fuel cell, in order to achieve proton mobility, it is necessary to moisturize the electrolyte membrane of the fuel cell and the vicinity thereof to achieve smooth movement of protons. For this reason, it is necessary even at below the freezing point to start the fuel cell system smoothly and, in order to achieve a stable operating condition, it is necessary to have some degree of water in the fuel cell.

The above related art does not accommodate short trips, in which there is a relatively short period of operation between the start of electrical generation by the fuel cell and the stopping of electrical generation. In the case of short trips, because electrical generation ends only a short period of time after the starting of electrical generation in the fuel cell, the temperature with the fuel cell system remains low. As a result, there is a small amount of vaporization of water within the fuel cell system, and a large amount of condensed water. Unlike water vapor, condensed water is difficult to scavenge. For this reason, residual water tends to accumulate within the passages of the fuel cell system, so that there is a high possibility of the water not being discharged to outside the passages. In addition, if the gas scavenging time is adjusted in accordance with the electrical generation time, in the case of a short trip, the gas scavenging time becomes short, and there is a great possibility that residual water is not discharged to outside the passages.

SUMMARY OF THE INVENTION

The present invention has as an object the provision of art for controlling the amount water remaining within a fuel cell system to an appropriate amount by the proper gas scavenging amount and gas scavenging time, even in the case of a short trip.

A first aspect of the present invention relates to fuel cell system having a fuel cell; a gas supply passage through which gas flows to the fuel cell; a gas exhaust passage exhausting gas from the fuel cell; a gas sending apparatus sending gas to the fuel cell via the gas supply passage; a residual water amount calculating part that calculates an amount of residual water in the fuel cell system that includes the fuel cell, the gas supply passage, and the gas exhaust passage, based on an operating condition of the fuel cell and an environmental condition under which the fuel cell is operated; a judging part judging whether or not at least one state quantity value that includes a generating duration of the fuel cell, an amount of electric power generated by the fuel cell, and an amount of temperature change of a coolant is equal to or less than a prescribed threshold value; an operating time calculating part calculating a time for operating the gas sending apparatus for decreasing the residual water amount to a prescribed value, according to the operating condition and the environmental condition; and a control part that operates the gas sending apparatus until the end of the operating time, wherein the operating time calculating part calculates a different operating time depending on whether or not one of the state quantity values is equal to or less than a prescribed threshold value. In this aspect, it is determined whether or not residual water in the fuel cell system freezes, based on a state quantity including the electrical generation time of the fuel cell, the amount of electrical generation, and the coolant temperature. A gas scavenging time suitable to the state quantity is determined. By performing gas scavenging for a gas scavenging time appropriate for the state quantity, it is possible to control the residual water in the fuel cell system to an appropriate amount.

The foregoing fuel cell system may further have a gas circulation passage that connects the gas exhaust passage to the gas supply passage; and a gas-liquid separator that separates water from the gas to be circulated; wherein the gas sending apparatus causes gas in the gas exhaust passage to circulate in the gas supply passage via the gas circulation passage.

The foregoing fuel cell system may further have a counter that records a number of times where at least one of the state quantity values is equal to or less than a prescribed threshold value is occurred, wherein the operating time calculating part calculates the period of time to operate the gas sending apparatus when the number of times is equal to or greater than the prescribed threshold value. In this aspect, the number of times a prescribed state quantity is reached is measured, and it is possible to determine the gas scavenging time suitable to the state quantity in accordance with the number of times.

In the foregoing fuel cell system, the control part may cause an increase in a drive amount of the gas sending apparatus by a prescribed value when at least one of the state quantity values is equal to or less than a prescribed threshold value. By doing this, it is possible to reduce the operating time of the gas sending apparatus.

In the foregoing fuel cell system, the control part may cause the gas sending apparatus to pulsate when at least one of the state quantity values is equal to or less than a prescribed threshold value. By doing this, it is possible to reduce the operating time of the gas sending apparatus.

In the foregoing fuel cell system, the gas sending apparatus may be a pump, and the control part may cause the rotational speed of the pump to increase by a prescribed value, when at least one of the state quantity values is equal to or less than a prescribed threshold value. By doing this, it is possible to shorten the operating time of the pump and, as a result, it is possible to shorten the gas scavenging time.

In the foregoing fuel cell system, the gas sending apparatus may be a pump, and the control part may cause the rotational speed of the pump to increase by a prescribed value, and also cause pulsation of the pump, when at least one of the state quantity values is equal to or less than a prescribed threshold value. By doing this, it is possible to reduce the operating time of the pump and, as a result, it is possible to shorten the gas scavenging time.

The foregoing fuel cell system may further have an information acquiring apparatus that acquires information including a position of the fuel cell system, a month and date, and an outside air temperature, and also an estimating apparatus that estimates a possibility of freezing of residual water in the fuel cell system based on the information; wherein the control part causes an amount of drive of the gas sending apparatus to increase by a prescribed value when the possibility of freezing exists. By doing this, it is possible to increase the certainty of avoiding freezing of residual water in the fuel cell system, even in a condition in which there is the possibility of freezing of the residual water in the fuel cell system.

The foregoing fuel cell system may further have an information acquiring apparatus that acquires information including a position of the fuel cell system, a month and day, and an outside air temperature, and also a estimating apparatus that estimates a possibility of freezing of residual water in the fuel cell system based on the information; wherein the control part causes the gas sending apparatus to pulsate when the possibility of freezing exists. By doing this, it is possible to increase the certainty of avoiding freezing of the residual water in the fuel cell system, even in a condition in which there is the possibility of freezing of the residual water in the fuel cell system.

A second aspect of the present invention relates to a method for reducing water in fuel cell system having a fuel cell, a gas supply passage for supplying gas to the fuel cell, and a gas exhaust passage exhausting gas from the fuel cell. In this method, a gas sending apparatus sends-gas to the fuel cell via the gas supply passage; a residual water amount calculation part calculates an amount of residual water in the fuel cell system that includes the fuel cell, the gas supply passage, and the gas exhaust passage, based on an operating condition of the fuel cell and an environmental condition in which the fuel cell is operated; a judging part judges whether or not at least one state quantity value that includes a generating duration of the fuel cell, an amount of electric power generation of the fuel cell, and an amount of temperature change of a coolant is equal to or less than a prescribed threshold value; an operating time calculation part calculates a time for operating the gas sending apparatus for decreasing the residual water amount to a prescribed value, according to the operating condition and the environmental condition; a control part operates the gas sending apparatus until the end of the operating time and calculating a different operating time depending on whether or not one of the state quantity values is equal to or less than a prescribed threshold value.

The foregoing method of reducing water content in a fuel cell system may further be provided with a gas circulation passage connecting the gas exhaust passage to the gas supply passage, wherein a gas in the gas exhaust passage is caused by the gas sending apparatus to circulate in the gas supply passage via the gas circulation passage; and wherein water is separated from the gas to be circulated by the gas-liquid separator.

According to the foregoing aspect, by scavenging residual water over a gas scavenging time suitable to a state quantity, it is possible to control the residual water in the fuel cell system to an appropriate amount.

BRIEF DESCRIPTION OF THE DRAWINGS

The foregoing and further objects, features, and advantages of the invention will become apparent from the following description of preferred embodiments, with reference to the accompanying drawings, wherein like numerals are used to represent like elements, and wherein.

DETAILED DESCRIPTION OF THE PREFERRED EMBODIMENTS

An apparatus for the purpose of embodying the present invention is described below, with reference to the accompanying drawings. What follows is merely exemplary of the constitution of embodiments, and shall be understood as not being restrictive of the constitution of embodiments of the present invention.

First Embodiment

Figure 1:
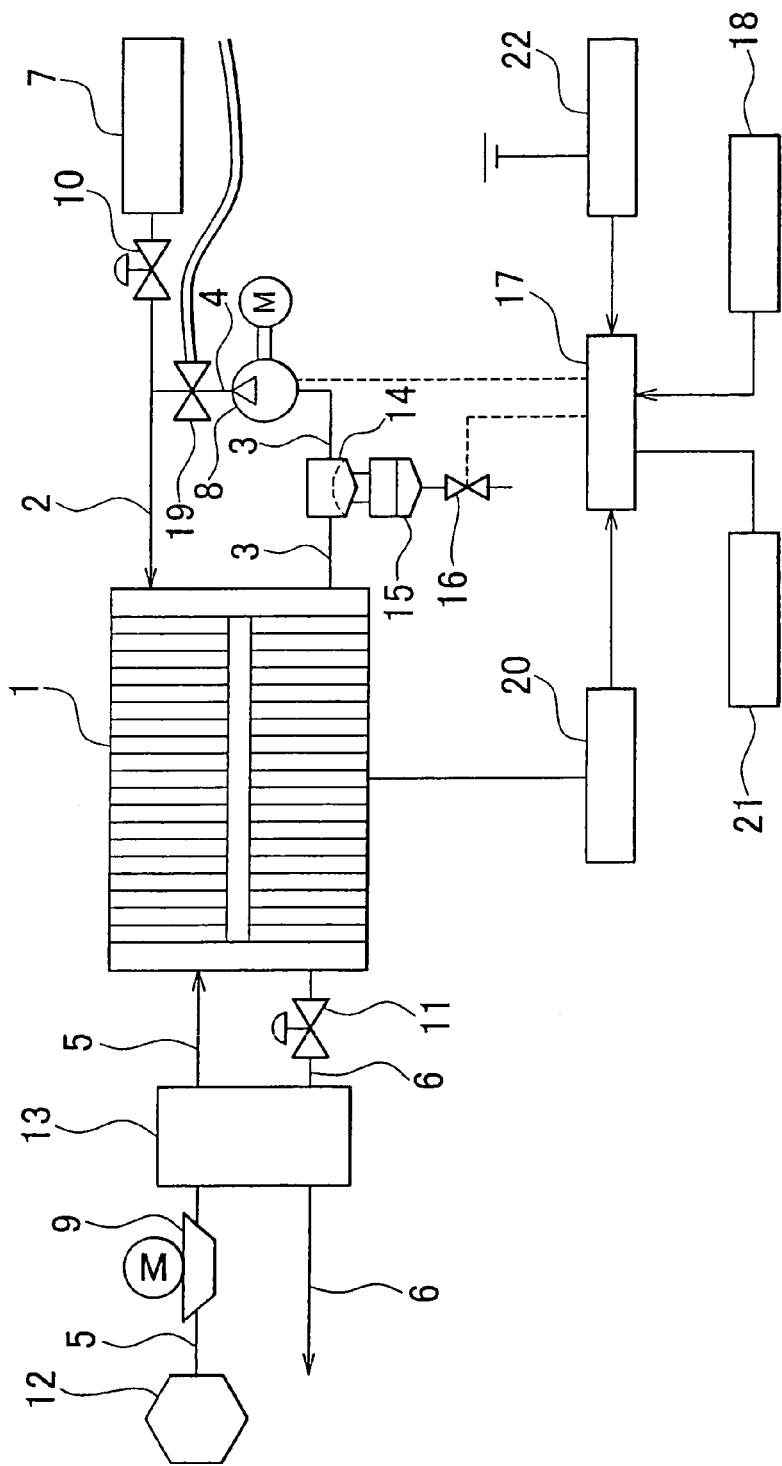
FIG. 1 shows the example of a configuration of a fuel cell system according to a first embodiment of the present invention.

A fuel cell system according to the first embodiment of the present invention is described below, based on FIG. 1 and FIG. 2. FIG. 1 shows an example of the configuration of a fuel cell system according to the first embodiment of the present invention. The fuel cell system shown in FIG. 1 has a fuel cell stack 1, an anode gas passage 2, an anode off-gas passage 3, an anode off-gas circulation passage 4, a cathode gas passage 5, a cathode off-gas passage 6, a hydrogen tank 7, a hydrogen pump 8, a pump 9, adjustments valves 10, 11, a filter 12, a humidifier 13, a gas-liquid separator 14, a drain tank 15, a water discharge valve 16, a control unit 17, a residual water amount calculating part 18, a purge valve 19, a state quantity measuring unit 20, a counter 21, and a navigation unit 22.

The fuel cell stack 1 is formed by the lamination of a plurality of cells. Each cell is formed by an anode (fuel electrode), a cathode (air electrode), and a separator. Flow passages for oxygen and air are formed between the anodes and the cathodes. The anode gas passage 2 is a passage that supplies anode gas that includes hydrogen to the anode side of the fuel cell stack 1. The cathode gas passage 5 is a passage that supplies cathode gas that includes air to the cathode side of the fuel cell stack 1.

The hydrogen tank 7 supplies anode gas to the anode gas passage 2. Anode gas that is supplied from the hydrogen tank 7 is adjusted to a prescribed pressure by the adjustment valve 10. The anode gas is supplied from the anode gas passage 2 to the anodes of the fuel cell stack 1. The pump 9 (also called an air compressor) is driven so as to supply cathode gas supplied from outside the fuel cell system to the cathodes of the fuel cell stack 1.

When anode gas is supplied to the anodes of the fuel cell stack 1, hydrogen ions are generated from the hydrogen contained in the anode gas. Oxygen contained in the air is supplied to the cathodes of the fuel cell stack 1. An electrochemical reaction between hydrogen and oxygen occurs in the fuel cell stack 1, so as to generate electrical energy. Additionally, at the cathodes of the fuel cell stack 1, water is created through the reaction of hydrogen ions created from the hydrogen with oxygen.

The humidifier 13 humidifies the air supplied to the fuel cell stack 1. The air is humidified because the electrolyte membrane with the fuel cell stack 1 must remain moist, in order to perform a proper electrochemical reaction within the fuel cell stack 1, the air is humidified. The water content in the electrolyte membrane is separated into fine clusters, and because these clusters join with sulfonic acid radicals within the electrolyte membrane, it is difficult for water content within the electrolyte membrane to freeze.

Non-reacted gas of the anode gas supplied to the anodes and gas including nitrogen and the like that permeates from the cathode (hereinafter referred to as anode off-gas) is sent from the fuel cell stack 1 to the anode off-gas passage 3. Non-reacted gas of the cathode gas supplied to the cathodes (hereinafter referred to as cathode off-gas) is discharged to the cathode off-gas passage 6 from the fuel cell stack 1. Cathode off-gas discharged from the cathodes passes through the cathode off-gas passage 6 and is discharged to outside of the fuel cell system.

Anode off-gas that has been discharged from the anodes of the fuel cell stack 1 passes through the anode off-gas passage 3 and the anode off-gas circulation passage 4 and is supplied to the anodes of the fuel cell stack 1 once again, together with anode gas from the hydrogen tank 7. Because a gas-liquid separator 14 is disposed in the anode off-gas passage 3, the anode off-gas passage 3 supplies anode off-gas discharged from the anodes of the fuel cell stack 1 to the gas-liquid separator 14.

The gas-liquid separator 14 separates water content and gases such as hydrogen and the like included in the anode off-gas discharged from the anodes of the fuel cell stack 1. Hydrogen separated from water content by the gas-liquid separator 14 passes through the anode off-gas circulation passage 4 as anode gas, and is supplied to the anode gas passage 2. The anode off-gas circulation passage 4 is a passage for supplying anode gas sent from the hydrogen pump 8 to the anode gas passage 2. The anode gas passage 2, by the anode off-gas passage 3 and the anode off-gas circulation passage 4, forms the anode-side circulation path.

The drain tank 15 collects water content that has been separated by the gas-liquid separator 14. By opening and closing the water discharge valve 16, water that has accumulated in the drain tank 15 is discharged to outside the circulation path. The water discharge valve 16 is appropriately opened and closed so that water accumulating in the drain tank 15 does not overflow.

The control unit 17 is electrically connected to the hydrogen pump 8 and the water discharge valve 16, and performs control of a driving of the hydrogen pump 8 and the water discharge valve 16. The residual water amount calculating part 18 predicts the amount of water that remains within the fuel cell system. The term of the residual water in the fuel cell system refers to water existing in the fuel cell stack 1, the anode gas passage 2, the anode off-gas passage 3, the anode off-gas circulation passage 4, the hydrogen pump 8, the gas-liquid separator 14, and the drain tank 15, and is the amount of water remaining within the fuel cell system that, under certain conditions, may freeze and is needed to dry.

When the amount of impurities such as nitrogen within the anode off-gas discharged from the anodes increases, the purge valve 19 discharges the anode off-gas (and anode gas circulated by the hydrogen pump 8), passing it through a dilutor (not illustrated) to outside the circulation path. The state quantity measuring unit 20 measures such quantities as the impedance (membrane resistance) between electrodes of the fuel cell stack 1, the accumulated load value (accumulated current value), the operating time, the coolant temperature or coolant temperature change amount, the outside air temperature, and the outside air humidity and the like.

The counter 21 records the number of times short trips occur. The navigation unit 22, by receiving a GPS (global positioning system) signal from a GPS satellite, acquires the current region information for the fuel cell system (position information) and the current date.

Figure 2:
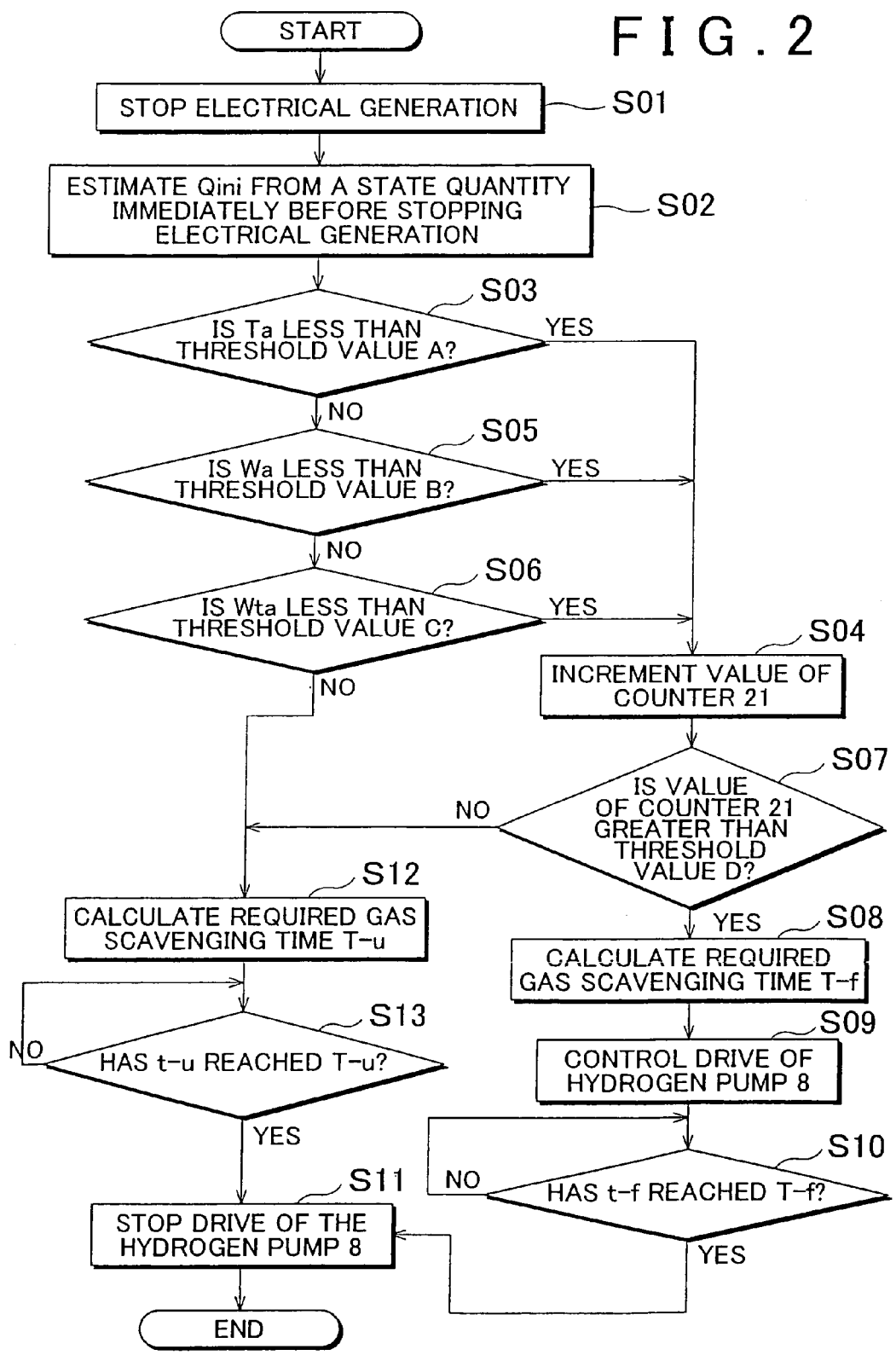
FIG. 2 is a flowchart describing the operation of a fuel cell system according to the first embodiment of the present invention.

FIG. 2 is a flowchart describing the operation of the fuel cell system according to the first embodiment of the present invention. The fuel cell system according to the first embodiment of the present invention executes the processing of FIG. 2 when processing is performed to stop the electrical generation in the fuel cell system. For example, when the ignition switch is set to off, a judgment is made that there was an instruction to stop the fuel cell system, and the processing of FIG. 2 is performed.

First, processing to stop the electrical generation in the fuel cell stack 1 is performed (step S01). Specifically, a shutoff valve (not illustrated) provided on the hydrogen tank 7 is closed, so as to stop electrical generation by shutting off the supply of anode gas from the hydrogen tank 7. In the fuel cell system according to the first embodiment of the present invention, in order to scavenge residual water remaining within the fuel cell system, anode gas and anode off-gas are circulated within the fuel cell system. Even after processing has been performed to stop the electrical generation in the fuel cell stack 1, residual water remaining within the fuel cell system is scavenged by driving the hydrogen pump 8.

Specifically, the control unit 17 controls the drive of the hydrogen pump 8 so as to cause the anode gas to circulate through the anode gas passage 2 and in the fuel cell stack 1. Also, the water included in the anode off-gas discharged from the anodes of the fuel cell stack 1 is separated from hydrogen and the like by the gas-liquid separator 14. The control unit 17 controls the drive of the water discharge valve 16 so as to discharge the separated water to outside the circulation path. In this embodiment, the processing that discharges water remaining in the fuel cell system after stopping the electrical generation on the fuel cell stack 1 from the gas-liquid separator 14 is referred to as gas scavenging and circulation processing.

In the fuel cell system according to the first embodiment of the present invention, scavenging is made of residual water remaining in the fuel cell system by a properly established gas scavenging time, even in the case in which a short trip occurs. For this reason, gas scavenging and circulation processing is performed with different scavenging times for the scavenging and circulation processing in the case of short trips and the gas scavenging and circulation processing when short trips do not occur.

Gas scavenging and circulation processing for the case in which short trips do not occur will be referred to as "normal gas scavenging and circulation processing." Gas scavenging and circulation processing for the case in which a short trip occurs will be referred to as "short trip gas scavenging and circulation processing." Additionally, when referring simply to "gas scavenging and circulation processing," this term shall be understood to include both normal gas scavenging and circulation processing and short trip gas scavenging and circulation processing.

Next, the residual water amount calculating part 18 predicts the amount of residual water remaining within the fuel cell system at the time of stoppage of electrical generation from a state quantity immediately before processing to stop electrical generation (step S02). For example, the residual water amount calculating part 18 calculates Qini by performing processing to estimate the residual water amount within the fuel cell system at the time of stopping electrical generation. Qini is the estimated value of the amount of water remaining within the fuel cell system at the time of stoppage of electrical generation, predicted from a state quantity immediately before processing to stop electrical generation. In this case, the residual water amount calculating part 18 acquires a state quantity from the state quantity measuring unit 20 and predicts the residual water amount within the fuel cell system.

State quantities include the impedance (membrane resistance) between electrodes of the fuel cell stack 1, the accumulated load value (accumulated current value), the operating time, the temperature or amount of change in temperature of the coolant, the outside air temperature, and the outside humidity or the like. By measuring the impedance between electrodes of the fuel cell stack 1, it is possible to know the state of dampness of the electrolyte membrane within the fuel cell stack 1. The impedance may be measured by applying a certain frequency AC current and voltage from a high-voltage electrical system between the electrodes of the fuel cell stack 1 and measuring the response. The impedance used is the value immediately before performing processing to stop electrical generation. By constant measurement of impedance that would allow the determination of the impedance just before the generation of electricity is stopped, it is possible to use the value of the impedance immediately before processing to stop electrical generation.

The accumulated load value (accumulated current value) is the total amount of electricity generated, and it is possible to know the total amount of water generated within the fuel cell by measuring the accumulated load value. The accumulated load value (accumulated current value) may be determined in units of kJ.

The operating time is the amount of time that the fuel cell system generates electricity. Between the case in which the time for generation of electricity in the fuel cell system is short and the time for generating electricity is long, the temperature within the passages is lower for the case in which the electrical generation time is short, even for an approximately equal amount of electrical generation. For this reason, the amount of liquid water is greater in the case of a short electrical generation time than in the case of a long electrical generation time. The operating time may be determined in units of minutes or seconds.

The coolant temperature is the temperature of the coolant (cooling water) (not illustrated) within the fuel cell system. With regard to the coolant temperature or coolant temperature change amount, rather than the absolute value, the amount of relative change describing the degree of heating is important. In the case in which the temperature within the fuel cell stack 1 is high, it is easy for water content within the fuel cell stack 1 to vaporize and leave to the outside of the fuel cell stack 1. In contrast, in the case in which the temperature within the fuel cell stack 1 is low, water content within the fuel cell stack 1 tends not to vaporize and to accumulate within the fuel cell system. The coolant temperature or coolant temperature change amount may be determined in units of ° C.

Because the heat radiated from the fuel cell stack 1 differs depending upon the outside air temperature, the outside air temperature affects the coolant temperature or coolant temperature change amount. Also, the outside air humidity influences the humidity within the passages and, therefore, influences the amount of residual water.

The above-described state quantities are the state quantities within a prescribed amount of time immediately after the stopping of electrical generation. It is also possible to combine a plurality of the above-noted state quantities in predicting the amount of residual water remaining within the fuel cell system after electrical generation is stopped.

Figure 3:
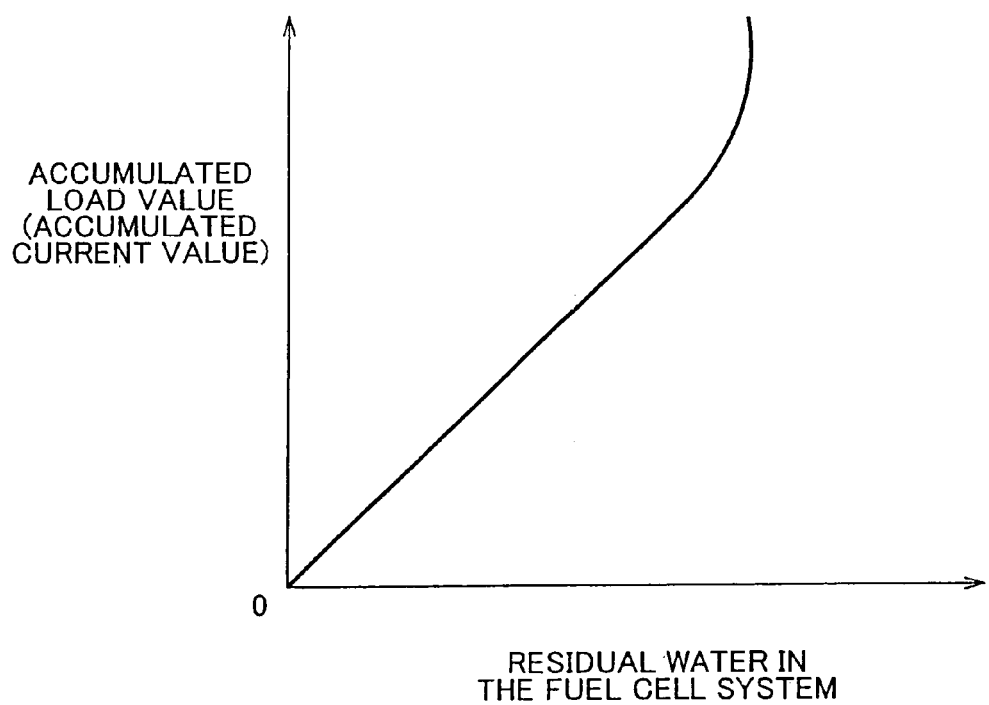
FIG. 3 shows an example of the relationship between a state quantity and the amount of residual water remaining within a fuel cell system.
Figure 4:
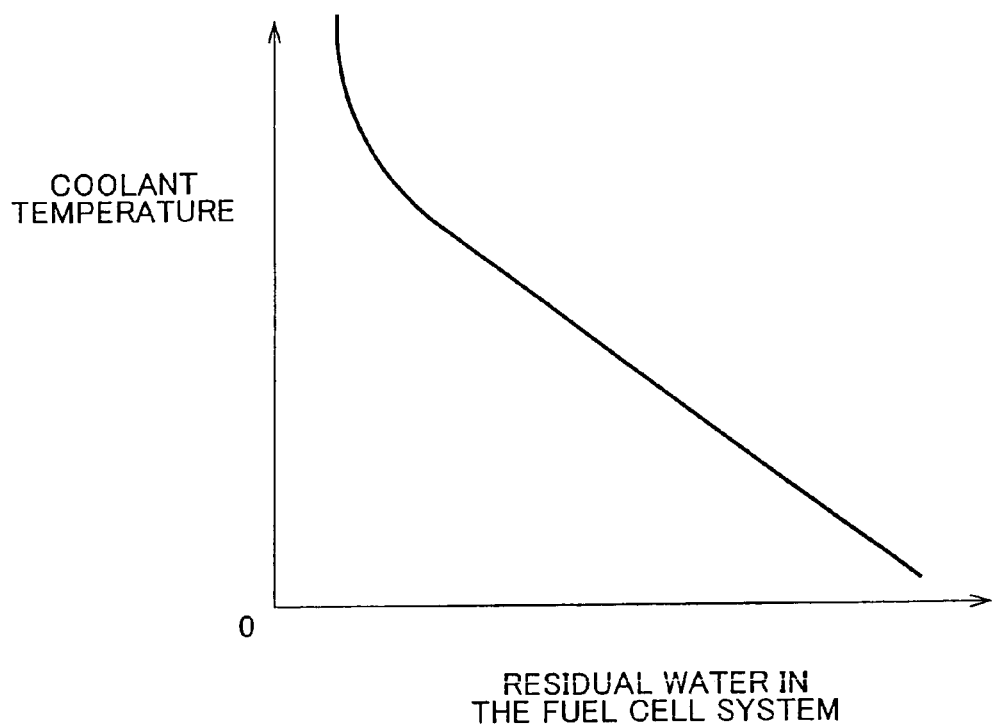
FIG. 4 shows an example of the relationship of a state quantity and the amount of residual water remaining within a fuel cell system.

FIG. 3 and FIG. 4 show the relationship between the state quantities and the amount of residual water remaining in the fuel cell system. In FIG. 3, a small value of residual water amount remaining within the fuel cell system is indicated for the case in which the accumulated load value is small, and a large value of residual water amount in the fuel cell system is indicated for the case in which the accumulated load value is large. In FIG. 4, a small value of residual water amount in the fuel cell system is indicated for the case of a high coolant temperature, and a large value of residual water within the fuel cell system is indicated for the case in which the coolant temperature is low.

The relationships such as this between the impedance (membrane resistance) between the electrodes of the fuel cell stack 1, the accumulated load amount (accumulated current amount); the operating time, the coolant temperature or coolant temperature change amount, the outside air temperature, the outside air humidity and the like and the amount of water remaining within the fuel cell system may be determined by empirically obtained equations.

Alternatively, it is possible to map the relationship between the amount of water remaining within the fuel cell system and the impedance (membrane resistance) between the electrodes of the fuel cell stack 1, the accumulated load value (accumulated current value), the operating time, the coolant temperature or coolant temperature change amount, the outside air temperature, or the outside humidity and the like by mapping beforehand, and referring to that map (table) so as to determine the relationship. The residual water amount calculating part 18 calculates Qini in accordance with an empirical equation or map. For example, of the state quantities, the impedance (membrane resistance) between electrodes of the fuel cell stack 1, the accumulated load value (accumulated current value), the operating time, and the coolant temperature or coolant temperature change amount and the like are referred to as operating history or operating states. Of the state quantities, the outside temperature and outside humidity and the like are referred to as use environment or operating environment.

Returning to FIG. 2, the control unit 17 includes a judging part that judges whether or not a short trip has occurred. Specifically, the control unit 17 makes a judgment as to whether the elapsed time Ta (operating time) from the start of electrical generation to the stoppage of electrical generation is below a prescribed threshold value A (step S03).

In this case, the control unit 17 acquires the elapsed time Ta (operating time) from the start of electrical generation to the stopping of electrical generation from the state quantity measuring unit 20. The prescribed threshold value A is a value used as a criterion in judging whether or not a short trip has occurred. The elapsed time Ta from the start of electrical generation to the stopping of electrical generation is the electrical generating time of the fuel cell system. In the case in which the electrical generation time is short, the amount of water that is liquid is large compared to the case in which the electrical generation time is long. In this case, there is insufficient scavenging of residual water in the fuel electrical system with normal gas scavenging and circulation processing. For this reason, in the case in which the elapsed time Ta from the start of electrical generation to the stopping of electrical generation is less than the prescribed threshold value A, a judgment is made that short trip has occurred.

In the case in which the elapsed time Ta from the start of electrical generation to the stopping of electrical generation is less than the prescribed threshold value A, the control unit 17 increments the value of the counter 21 by one (step S04).

In contrast, if the elapsed time Ta from the start of electrical generation to the stopping of electrical generation is greater than the prescribed threshold value A, the control unit 17 makes a judgment as to whether or not the accumulated load value (accumulated current value) Wa from the start of electrical generation to the stopping of electrical generation is below a prescribed threshold value B (step S05).

The prescribed threshold value B is a value that serves as a criterion for judging whether or not a short trip has occurred. If the accumulated load value (accumulated current value) Wa from the start of electrical generation to the stopping of electrical generation has not reached the prescribed threshold value B, there is a possibility that the fuel cell system has not internally warmed up. In this case, if normal gas scavenging and circulation processing, there is insufficient scavenging of water remaining within the fuel cell system. For this reason, in the case in which the accumulated load value (accumulated current value) Ma from the start of electrical generation to the stopping of electrical generation is less than the prescribed threshold value B, the control unit 17 performs the processing of step S04, and assumes that a short trip has occurred.

At the judgment of step S05, in the case in which the accumulated load value (accumulated current value) Wa from the start of electrical generation to the stopping of electrical generation is not below the prescribed threshold value B, the control unit 17 makes a judgment as to whether or not the coolant temperature amount (cooling water change in temperature) Wta from the start of electrical generation to the stopping of electrical generation is below a prescribed threshold value C (step S06).

The prescribed value C is a value that serves as a criterion for judging whether or not a short trip has occurred. If the coolant temperature change amount (cooling water change in temperature) Wta from the start of electrical generation to the stopping of electrical generation has not reached the prescribed threshold value C, the amount of heat released by the fuel cell system is low, and there is a possibility that the temperature within the fuel cell system is not high. For this reason, in the case in which the coolant temperature change amount (cooling water change in temperature) Wta from the start of electrical generation to the stopping of electrical generation is below the threshold value C, the control unit 17 performs the processing of step S04 and assumes that a short trip has occurred. In this case, it is possible to use the coolant temperature (cooling water temperature) in place of the coolant temperature change amount (cooling water change in temperature) Wta.

When the counter 21 value is incremented (counted up) by one, (in the case of a positive judgment at any of steps S03, S05, and S06), the control unit 17 makes a judgment as to whether the value of counter 21 has reached or exceeded a prescribed threshold value D (step S07). The prescribed threshold value D can be any value between one and N.

Even if a short trip has occurred, there are cases in which, depending on the amount of water remaining in the fuel cell system and the state quantities, it is not necessary to perform short trip gas scavenging and circulation processing. In this case, it is sufficient if short trip gas scavenging and circulation processing is performed when a short trip has occurred a prescribed number of times. In this embodiment, by providing the counter 21, short trip gas scavenging and circulation processing is performed when a short trip has occurred a prescribed number of times.

This embodiment is the example in which the counter 21 is provided in the short trip scavenging and circulation processing. However, the embodiment of the present invention is not restricted to this constitution and, for example, the following processing shown in FIG. 2 can be performed without providing the counter 21 in the short trip gas scavenging and circulation processing.

In this case, after a positive judgment has been made that a short trip has occurred, at any one of the steps S03, S05, and S06, it is sufficient to perform the processing of step S08 without making a judgment with regard to the number of short trips that have occurred (processing of steps S04 and S07).

Next, in the case in which the value of the counter 21 has reached or exceeded the prescribed threshold value D, the operating time calculating part included in the control unit 17 uses Qini to calculate the required gas scavenging time T-f (step S08). Specifically, prior mapping is done of the relationship between Qini and the amount of short trip gas scavenging and circulation processing time required to scavenge the residual water in the fuel cell system to a proper quantity (Qreq). Then, the required scavenging time T-f corresponding to a value of Qini is determined from the map.

The proper quantity (Qreq) is the amount of residual water that enables avoidance of freezing of the residual water within the fuel cell system. Therefore, the proper amount (Qreq) may be determined as the appropriate value for the purpose of avoiding freezing of the water remaining within the fuel cell system. The proper quantity (Qreq) is dependent upon the MEA (membrane electrode assembly) and the constituent components. In addition, the value of the proper quantity (Qreq) is a value that varies depending on whether the operating environment of the fuel cell system in this embodiment is a cold region or a warm region.

The required scavenging time T-f is the short trip gas scavenging and circulation processing time required to scavenge the residual water in the fuel cell stack 1. The required scavenging time T-f is determined as an appropriate value for the purpose of avoiding freezing of the water remaining within the fuel cell system. The required scavenging time T-f is determined as a time when performing scavenging and circulation processing within the fuel cell system that is the appropriate amount of scavenging in the case in which a short trip occurs. For example, in the case in which a short trip occurs, compared to the case of a normal operating history (operating history in which there is no short trip), there is a possibility that the temperature with the fuel cell system is low. For this reason, even if normal gas scavenging and circulation processing is performed in the case in which a short trip has occurred, there are cases in which it is not possible to avoid freezing of water remaining within the fuel cell system. Given this, in the short trip gas scavenging and circulation processing, the required gas scavenging time T-f is determined as a value that is different from normal gas scavenging and circulation processing.

Specifically, mapping of the relationship between Qini and the required gas scavenging time T-f is performed based on a state quantity. The state quantity serving as the short trip criterion (for example, the operating time) is made a small value. For this reason, in the case of mapping the short trip gas scavenging and circulation, the state quantity is made a small value. For the part that performs mapping using a small value of state quantity, therefore, it is necessary to perform more detailed generation. By performing generation with more detail for the part that uses a small value of a state quantity, it is possible to calculate the required gas scavenging time T-f with improved accuracy. The required gas scavenging time T-f may be determined in units of seconds.

Next the control unit 17 performs drive control of the hydrogen pump 8 (step S09). Specifically, the control unit 17 controls the drive of the hydrogen pump 8 so as to increase the rotational speed of the hydrogen pump 8.

Rather than controlling the drive of the hydrogen pump 8 so as to increase the rotational speed of the hydrogen pump, the control unit 17 may alternatively switch the drive of the rotation of the hydrogen pump 8 in a pulsating manner. Additionally, the control unit 17 may control the drive of the hydrogen pump 8 so as to increase the rotational speed of the hydrogen pump 8 and also switch the drive of the rotation of the hydrogen pump 8 in a pulsating manner.

The rotational speed of the hydrogen pump 8 required in this case (that is, the increase in the rpm of the hydrogen pump 8) can be determined empirically (or by simulation). The feeding speed (discharging speed) of the hydrogen pump 8 after switching the drive thereof in a pulsating manner can be determined empirically (or by simulation).

The (1) controlling the drive of the hydrogen pump 8 so as to increase the rpm thereof, (2) performing control so as to switch the rotational drive of the hydrogen pump 8 in a pulsating manner, and (3) controlling the drive of the hydrogen pump 8 so as to increase the rpm thereof and also performing control so as to switch the rotational drive of the hydrogen pump 8 in a pulsating manner are referred to as setting the forced water discharge mode to on.

Figure 5:
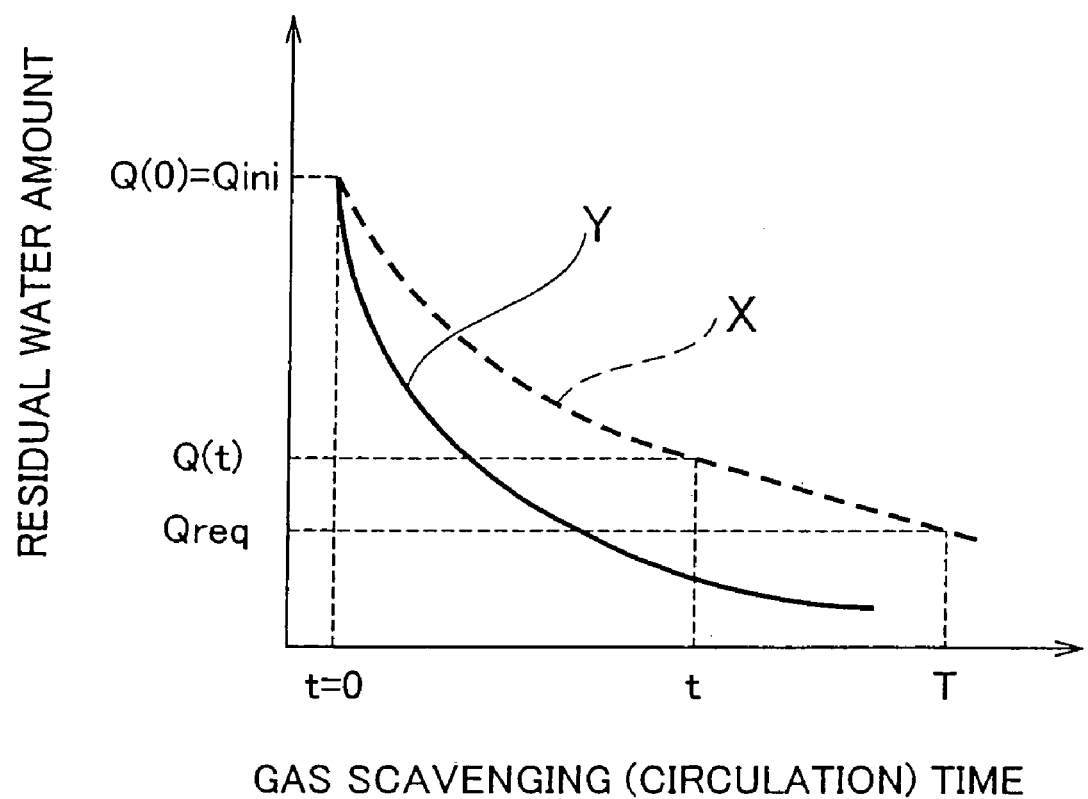
FIG. 5 shows the relationship of correspondence between the gas scavenging (circulation) time for gas scavenging and circulation processing and the amount of residual water.

FIG. 5 shows the relationship of correspondence between the amount of residual water and the gas scavenging (circulation) time of gas scavenging and circulation processing. The curve X in FIG. 5 is an example of the relationship of correspondence between the amount of residual water and the gas scavenging (circulation) time for normal gas scavenging and circulation processing. The curve Y is an example of the relationship of correspondence between the amount of residual water and the gas scavenging (circulation) time for the case in which forced water discharge mode is set to on in short trip gas scavenging and circulation processing. The curve Y shows a larger amount of reduction in the amount of residual water within the fuel cell stack 1 with respect to the gas scavenging (circulation) time than does the curve X.

In this manner, in the case of setting the forced water discharge mode to on in short trip gas scavenging and circulation processing the amount of residual water in the fuel cell stack 1 is reduced more quickly than the case of performing normal gas scavenging and circulation processing. For the case of the same amount of residual water, therefore, the amount of time required to reach the proper amount (Qreq) is shorter than in the case of performing normal gas scavenging and circulation processing. As a result, the time required to complete the fuel cell system is shortened.

In the case of driving the hydrogen pump 8 so as to increase the rotational speed thereof, the control unit 17 may recalculated the required gas scavenging time T-f after increasing the rpm of the hydrogen pump 8. Additionally, in the case of performing control of the switching of the rotational drive of the hydrogen pump 8 in a pulsating manner, the control unit 17 may recalculate the required gas scavenging T-f after switching of the rotational drive of the hydrogen pump 8 in a pulsating manner.

In the case of controlling the drive of the hydrogen pump 8 so as to increase the rotational speed thereof and also performing control of the switching of the rotational drive of the hydrogen pump 8 in a pulsating manner, the unit may recalculate the required gas scavenging time T-f after increasing the rotational speed of the hydrogen pump 8 and also after performing control of the switching of the rotational drive of the hydrogen pump 8 in a pulsating manner. In these cases, subsequent processing (steps S10 and S11 in FIG. 2) may be performed using the recalculated required gas scavenging time T-f.

The above-described embodiment is an example in which the forced water discharge mode is set to on in short trip gas scavenging and circulation processing. The embodiment of the present invention, however, is not restricted in this manner and, for example, can be made so that the forced water discharge mode is not set to on in the short trip gas scavenging and circulation processing. That is, gas scavenging for short trips may be accommodated by changing the gas scavenging time in the normal water discharge mode. In this case, after the processing of step S08, the processing of step S10 is performed without performing the processing of S09.

The control unit 17 makes a judgment as to whether or not the gas scavenging and circulation processing time for a short trip has reached the required gas scavenging time T-f (step S10). Specifically, the control unit 17 acquires the elapsed time t-f of the gas scavenging and circulation processing for a short trip from a timer (not illustrated) that counts the time of short trip gas scavenging and circulation processing, and compares this with the required gas scavenging time T-f. The control unit 17 makes a judgment as to whether the acquired elapsed time t-f of the short trip gas scavenging and circulation processing is a value that is the same as or greater than the required gas scavenging time T-f.

If the short trip gas scavenging and circulation processing time has not reached the required gas scavenging time T-f, the control unit 17 continues the short trip gas scavenging and circulation processing. If, however, the short trip gas scavenging and circulation processing time has reached the required gas scavenging time T-f, the control unit 17 performs control so as to stop the drive of the hydrogen pump 8 (step S11).

If the control unit 17 performs control so as to stop the hydrogen pump 8, the operation of the fuel cell system is stopped.

At the judgment of step S06, if the judgment is made that the amount of change in the coolant temperature (cooling water temperature change) from the start of electrical generation to the stopping of electrical generation is not below the prescribed threshold value C, operating time calculation part included in the control unit 17 calculates the required gas scavenging time T-u using Qini (step S12). Because the specific calculation method is the same as the method of calculating the required gas scavenging time T-f using Qini at step S08, it will not be described herein.

The required gas scavenging time T-u is the time required for normal gas scavenging and circulation processing to scavenge residual water within the fuel cell stack 1. The required gas scavenging time T-u is calculated as an appropriate value for avoiding freezing of residual water within the fuel cell system. The required gas scavenging time T-u may be determined in units of seconds. If the judgment at step S07 is that the value of the counter has not reached or exceeded the prescribed threshold value D, the processing of step S12 is performed.

The control unit 17 performs a judgment as to whether or not the normal gas scavenging and circulation processing time has reached the required gas scavenging and circulation time T-u (step S13). Specifically, the control unit 17 acquires the elapsed time t-u of the normal gas scavenging and circulation processing from the timer (not illustrated) that counts the normal gas scavenging and circulation processing time and compares this with the required gas scavenging time T-u. The control unit 17 then judges whether the acquired elapsed time t-u of the normal gas scavenging and circulation processing is the same or greater than the required gas scavenging time T-u.

If the normal gas scavenging and circulation processing time has not reached the required gas scavenging time T-u, the control unit 17 continues the normal gas scavenging and circulation processing. If, however, the normal gas scavenging and circulation processing time has reached the required gas scavenging time T-u, the processing of step S11 is performed.

According to this embodiment, even if a short trip occurs a proper gas scavenging time for scavenging residual water within the fuel cell stack 1 is determined. For this reason, it is possible to control the residual water amount in the fuel cell system to a proper amount that avoids freezing. Also, according to this embodiment, in the case in which a short trip occurs, the drive of the hydrogen pump 8 is controlled so as to increase the rotational speed thereof, and control is performed so as to switch the rotational drive of the hydrogen pump 8 in a pulsating manner. As a result, it is possible to reliably avoid freezing of residual water in the fuel cell system. In the case in which a short trip occurs, because of the ability to calculate the proper gas scavenging time, it is possible to inhibit the accumulation of water caused by insufficient gas scavenging.

Second Embodiment

The second embodiment of the present invention is described below with reference to FIG. 6. This embodiment is described for the case in which, in gas scavenging and circulation processing, a judgment is made as to whether or not there is a possibility of freezing, based on the region navigated, the month and day information, and the outside air temperature and the like, and in which the forced water discharge mode is set to on. Because other constituent elements and effects are the same as the first embodiment, they are assigned the same numerals and are not described herein. Reference will be made to FIG. 1 through FIG. 5, as necessary.

Figure 6:
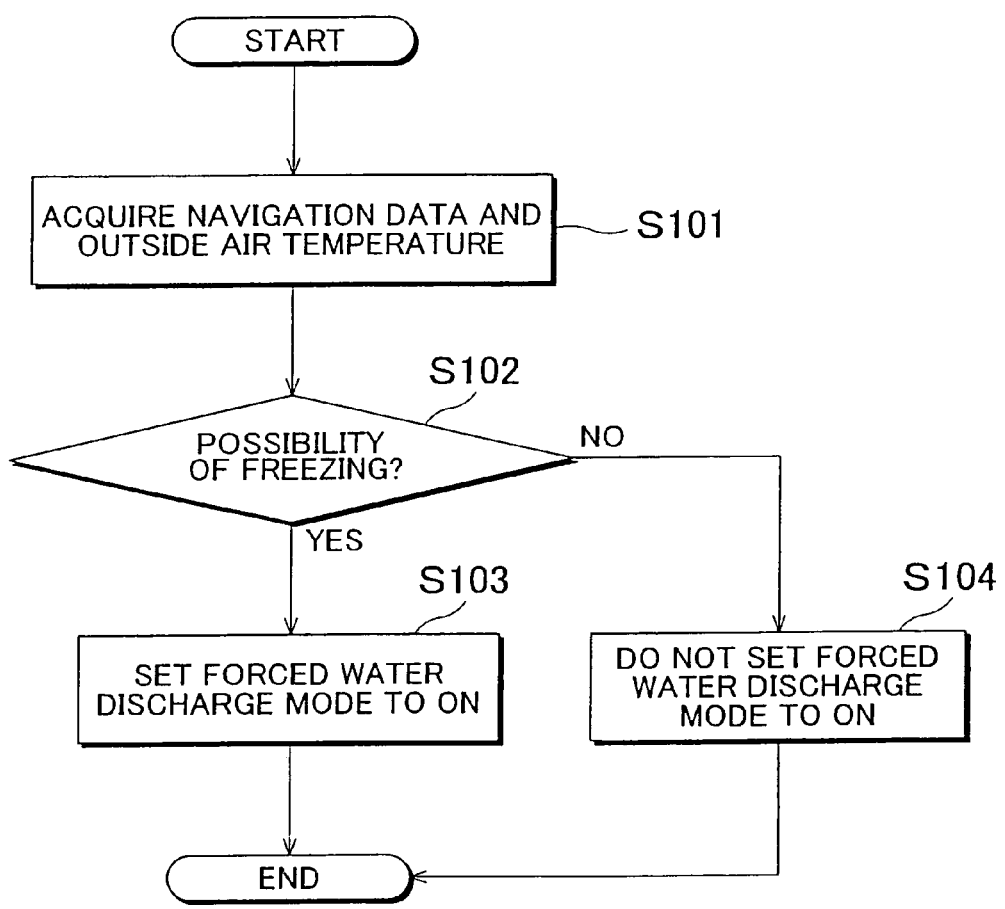
FIG. 6 is a flowchart showing the processing for executing a judgment about the existence of the possibility of freezing, based on navigated territory, month and day information, and outside temperatures and the like, and executing the enabling of the forced water discharge mode.

FIG. 6 shows the processing of making a judgment as to whether or not there is a possibility of freezing, based on the region navigated, the month and day information, and the outside air temperature and the like, and setting the forced water discharge mode to on.

The control unit 17 first acquires navigation data and the outside air temperature (step S101). Specifically, the control unit 17 acquires navigation data from the navigation unit 22. Navigation data includes the current region information (position information) for the fuel cell system and the current date and the like. The navigation unit 22 acquires the current region information (position information) for the fuel cell system and the current date and the like from a GPS satellite. The control unit 17 acquires the current outside air temperature from the state quantity measuring unit 20.

Although this embodiment is an example in which the navigation unit 22 acquires the current date in the fuel cell system from a GPS system, the embodiment of the present invention is not restricted in this manner and, for example, the navigation unit 22 may acquire the current date from a clock (not illustrated) provided in the fuel cell system.

Next, the control unit 17, which has a freezing estimation part that judges whether there is the possibility of freezing of residual water in the fuel cell system after gas scavenging and circulation processing, judges the possibility of freezing (step S102). The possibility of freezing of residual water in the a fuel cell system for the case in which gas scavenging and circulation processing is performed is the estimation of the probability that residual water remaining in the fuel cell system after operation of the fuel cell system freezes. Specifically, the possibility of freezing of residual water in a fuel cell system is determined by an actual measurement (or simulation) based on the current region information (position information) of the fuel cell system, the current date, the current outside air temperature, the proper quantity (Qreq), and a state quantity.

If there is the possibility of freezing of residual water in a fuel cell system after gas scavenging and circulation processing, the control unit 17 sets the forced water discharge mode to on (step S103) and then, with the forced water discharge mode set to on, continues performing gas scavenging and circulation processing. In this case, the rpm (that is, the increase in rpm) of the hydrogen pump 8 after the rpm is increased can be determined by experiment (or simulation) based on the current region information (position information) of the fuel cell system, the current date, the current outside air temperature, the proper quantity (Qreq), and a state quantity.

The drive amount of the hydrogen pump 8 after switching the drive of the hydrogen pump 8 in a pulsating manner can be determined by experiment (or simulation) based on the current region information (position information) of the fuel cell system, the current date, the current outside air temperature, and the proper amount (Qreq), and a state quantity.

In the case in which the drive of the hydrogen pump 8 is controlled so as to increase the rotational speed thereof, the control unit 17 may recalculate the required gas scavenging time T-f or the required gas scavenging time T-u after the rotational speed of the hydrogen pump 8 is increased. Additionally, in the case in which control is performed so that the rotational drive of the hydrogen pump 8 is switched in a pulsating manner, the control unit 17 may recalculate the required gas scavenging time T-f or the required gas scavenging time T-u after drive of the hydrogen pump 8 is switched in a pulsating manner.

In the case in which the drive of the hydrogen pump 8 is controlled so as to increase the rotational speed of the hydrogen pump 8 and also control is performed so as to switch the drive of the hydrogen pump 8 in a pulsating manner, the control unit 17 may recalculate the required gas scavenging time T-f or the required gas scavenging time T-u after the rotational speed of the hydrogen pump 8 is increased and after switching the rotational drive of the hydrogen pump 8 in a pulsating manner. In these cases, the gas scavenging and circulation processing may be performed using the recalculated required gas scavenging time T-f or the recalculated gas scavenging time T-u.

In the case in which there is no possibility of freezing of residual water in the fuel cell system after gas scavenging and circulation processing, the control unit 17 does not set the forced water discharge mode to on (step S104), and continues the gas scavenging and circulation processing without switching the forced water discharge mode to on.

According to this embodiment, a judgment is made as to the possibility of freezing of residual water in the fuel cell system based on the region, the month and day information, and the like. As a result, it is possible to increase the certainty of avoiding freezing of residual water in the fuel cell system, even in an environment in there is a high probably of freezing of residual water in the fuel cell system. Because a proper gas scavenging time can be calculated after setting the forced water discharge mode to on, it is possible to inhibit accumulate of water due to insufficient gas scavenging.

Variation

Although in the fuel cell system of the above-described embodiment gas scavenging processing is performed by drive of the hydrogen pump 8, rather than by using the hydrogen pump 8, the amount of water content in the fuel cell system or in the anode side passage may be reduced by supplying an inert gas (for example, nitrogen). In this case, the source of the inert gas is provided so as to be connected to the anode gas passage 2, and it is possible to achieve the same effect by controlling the supply of the inert gas as by driving the hydrogen pump 8. In the case of using an inert gas, the anode gas passage 2 and the anode off-gas passage 3 may serve also as a supply passage for the inert gas and a discharge passage for the inert gas.

In the first embodiment and the second embodiment, the fuel cell system has a hydrogen pump 8 and a gas-liquid separator 14 on the anode side. For example, the pump 9 on the cathode side may be used to perform gas scavenging of residual water in the fuel cell system, as is the hydrogen pump 8.

The gas-liquid separator 14 in the anode off-gas passage 3 may be provided in the cathode off-gas passage 6. Additionally, in that case a drain tank 15 and a water discharge valve 16 may be provided in the gas-liquid separator 14.

In the case of providing the gas-liquid separator in the cathode off-gas passage 6, a cathode off-gas circulation passage may be provided, with air discharged to the cathode off-gas passage 6 passing through the cathode off-gas circulation passage and being supplied to the cathodes of the fuel cell stack 1 again, together with the cathode gas supplied from outside the fuel cell system. By providing this cathode off-gas circulation passage, a cathode-side circulation path is formed by the cathode gas passage 5, the cathode off-gas passage 6, and the cathode off-gas circulation path. By controlling the drive of the pump 9 and the gas-liquid separator 14, it is possible to discharge residual water in the fuel cell system to outside the circulation path.

For example, with a hydrogen pump 8 and a gas-liquid separator 14 provided in the anode gas passage 2, the pump 9 may be used to perform gas scavenging of residual water in the fuel cell system. A cathode gas-liquid separator may be provided in the cathode off-gas passage 6, in which case a drain tank 15 and a water discharge 16 may be provided in the cathode gas-liquid separator.

In the above case as well, a cathode off-gas circulation passage may be provided, with air discharged to the cathode off-gas passage 6 passing through the cathode off-gas circulation passage and being supplied to the cathodes of the fuel cell stack 1 again, together with the cathode gas supplied from outside the fuel cell system. A cathode-side circulation path is formed by providing this cathode off-gas circulation passage. By controlling any or all of the hydrogen pump 8, the pump 9, the gas-liquid separator 14, and the cathode-side gas-liquid separator, it is possible to discharge residual water in the fuel cell system to outside the circulation path.

Although in the above-noted embodiment the example is one in which an anode off-gas circulation path is provided on the anode side, rather than providing an anode off-gas circulation path, by disposing a pump in the same manner as on the cathode side and controlling the drive thereof, it is possible to control the residual water in the fuel cell system to a proper amount by a proper gas scavenging amount and gas scavenging time even in the case in which a short trip occurs.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, fewer, or only a single element, are also within the scope of the invention.

The invention claimed is:

1. A fuel cell system comprising:
    a fuel cell;
    a gas supply passage that supplies gas to the fuel cell;
    a gas exhaust passage to which gas from the fuel cell is exhausted;
    a gas sending apparatus that sends gas to the fuel cell via the gas supply passage;
    a residual water amount calculating part programmed to calculate an amount of residual water in the fuel cell system that includes the fuel cell, the gas supply passage, and the gas exhaust passage, based on an operating condition of the fuel cell and an environmental condition under which the fuel cell is operated;
    a judging part programmed to judge whether or not at least one state quantity value that includes a generating duration of the fuel cell, an amount of electric power generated by the fuel cell, and an amount of temperature change of a coolant during electrical generation of the fuel cell is equal to or less than a prescribed threshold value for judging whether or not a short trip has occurred;
    an operating time calculating part programmed to calculate a time for operating the gas sending apparatus for decreasing the residual water amount to a prescribed value, according to the operating condition and the environmental condition; and
    a control part programmed to operate the gas sending apparatus until the end of the operating time,
    wherein the operating time calculating part calculates a different operating time depending on whether or not, according to the judging part, one of the state quantity values is equal to or less than a prescribed threshold value.

2. The fuel cell system according to claim 1, further comprising:
    a gas circulation passage that connects the gas exhaust passage to the gas supply passage; and
    a gas-liquid separator that separates water from the gas to be circulated;
    wherein the gas sending apparatus causes gas in the gas exhaust passage to circulate in the gas supply passage via the gas circulation passage.

3. The fuel cell system according to claim 1, further comprising:
- a counter that records a number of times of judging that at least one of the state quantity values is equal to or less than a prescribed threshold value,
- wherein the operating time calculating part calculates a time to operate the gas sending apparatus when the number of times is equal to or greater than the prescribed threshold value.

4. The fuel cell system according to claim 1, wherein the control part causes an increase in a drive amount of the gas sending apparatus by a prescribed value when at least one of the state quantity values is equal to or less than a prescribed threshold value.

5. The fuel cell system according to claim 1, wherein the control part causes the gas sending apparatus to pulsate when at least one of the state quantity values is equal to or less than a prescribed threshold value.

6. The fuel cell system according to claim 1, wherein the gas sending apparatus is a pump, and the control part causes the rotational speed of the pump to increase by a prescribed value, when at least one of the state quantity values is equal to or less than a prescribed threshold value.

7. The fuel cell system according to claim 1, wherein the gas sending apparatus is a pump, and the control part causes the rotational speed of the pump to increase by a prescribed value, and also causes pulsation of the drive of the pump, when at least one of the state quantity values is equal to or less than a prescribed threshold value.

8. The fuel cell system according to claim 1, further comprising:
- an information acquiring apparatus that acquires information including a position of the fuel cell system, a month and date, and an outside air temperature, and also
- an estimating part that estimates a possibility of freezing of residual water in the fuel cell system based on the information;
- wherein the control part causes an amount of drive of the gas sending apparatus to increase by a prescribed value when the possibility of freezing exists.

9. The fuel cell system according to claim 1, further comprising:
- an information acquiring apparatus that acquires information including a position of the fuel cell system, a month and day, and
- an outside air temperature, and also a estimating part that estimates a possibility of freezing of residual water in the fuel cell system based on the information;
- wherein the control part causes the gas sending apparatus to pulsate when the possibility of freezing exists.

* * * * *